Patented May 28, 1946

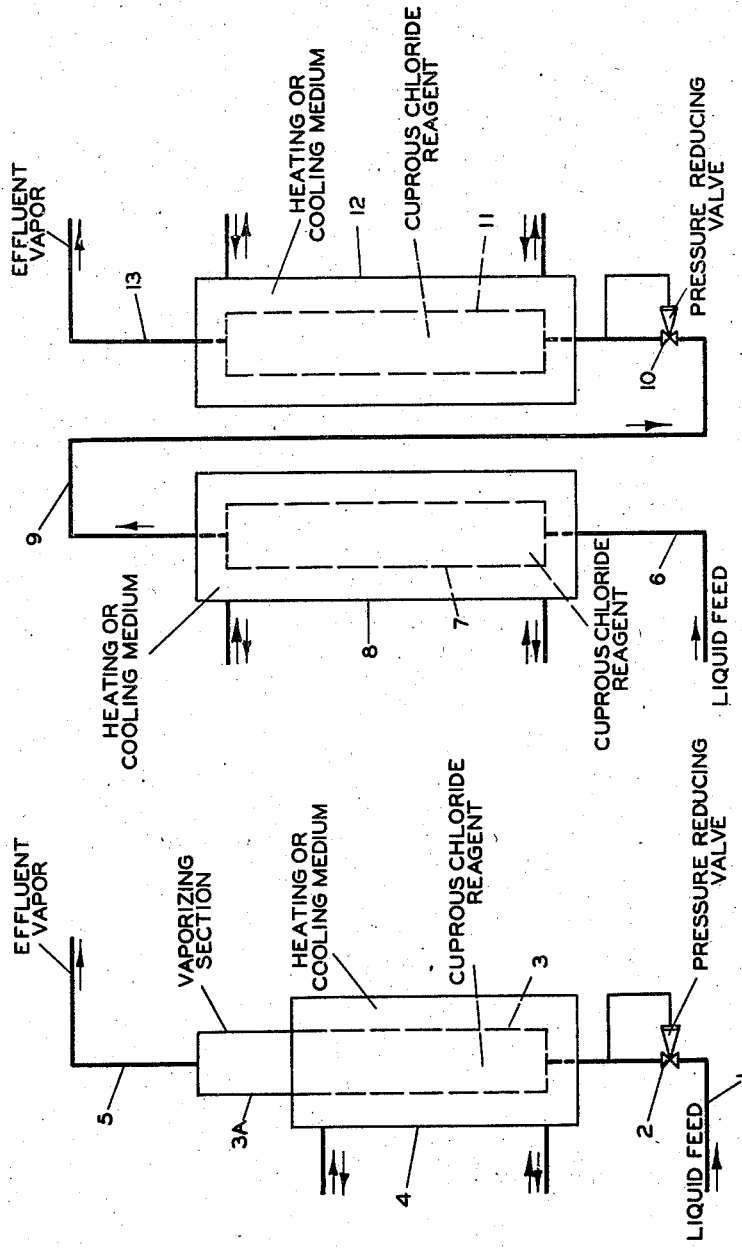

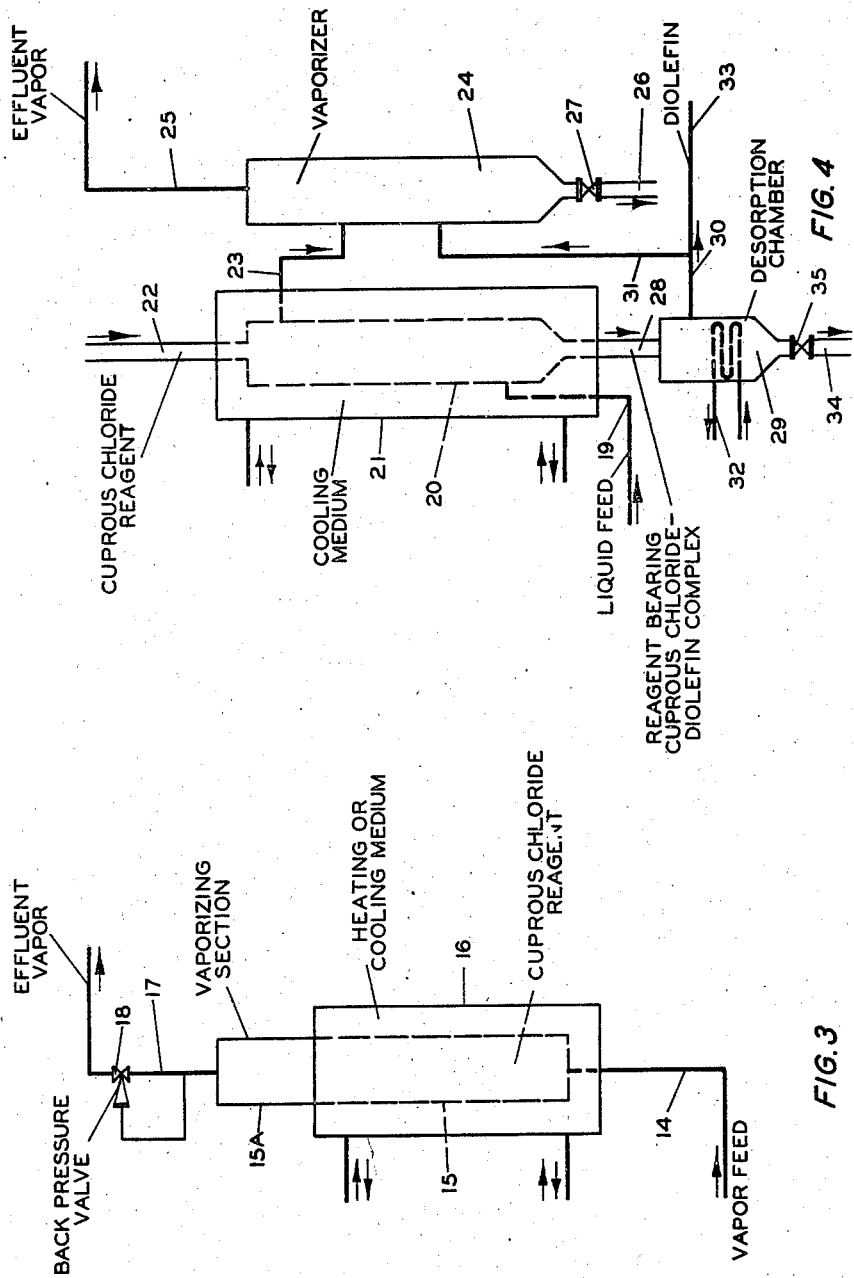

2,401,114

UNITED STATES PATENT OFFICE 2,401,114

PROCESS FOR THE SEPARATION OF DIOLEFINS FROM HYDROCARBON MIXTURES

Walter A. Schulze and Graham H. Short, Bartlesville, Okla., assignors to Phillips Petroleum Company, a corporation of Delaware Application August 26, 1941, Serial No. 408,372

4 Claims. (Cl. 260—681.5)

This invention relates to a process for the treatment of low-boiling hydrocarbon mixtures for the separation and recovery of diolefins therefrom. More specifically it relates to certain improved methods and reagents for separating diolefins from hydrocarbon mixtures containing same along with olefinic and paraffinic hydrocarbons of similar boiling points.

In the pyrolytic and/or catalytic treatment of liquid or gaseous hydrocarbon stocks, petroleum fractions or other organic liquids for the production of valuable diolefins, a final separation or purification step is ordinarily required. The diolefin as produced is usually a component of a complex mixture containing the corresponding mono-olefins and paraffins, and diolefin separation by conventional methods is extremely difficult. Thus, in order to obtain the diolefin in the substantially pure form desired for many types of utilization, a highly selective purification treatment is necessary. Under these circumstances chemical separation processes have been proposed to separate the diolefins as addition compounds by means of a thermally-reversible addition reaction with certain metal salts, including salts of the mono-valent forms of heavy metals of groups I and II of the periodic table.

Certain conjugated diolefins including butadiene react under proper conditions with said metal salts, particularly the cuprous halides, to form addition compounds from which the diolefin may be recovered by mild heating. While this reaction is not specific for diolefins, the use of aqueous cuprous halide solutions for the separation of diolefins from hydrocarbon gases has been proposed. Such processes suffer the disadvantages of a non-specific reaction and the difficulty of preventing the inclusion of the reaction products of olefins, acetylenes, and the like in the aqueous reagent solution or the solid diolefin addition product which must be separated from said solution. In addition, operating difficulties with aqueous solution are magnified by the instability and corrosive qualities of the solution and the mutual immiscibility of the hydrocarbon vapor and the aqueous phases.

We have now discovered methods of preparing and using solid cuprous halide reagents which represent valuable improvements over prior processes from the standpoint of operating economy and efficiency. Our invention embodies a novel reagent composition which exhibits both very high reactivity toward diolefins and a very complete utilization of the cuprous halide in forming the diolefin addition compound. Further, our reagent composition includes high proportions of active ingredients and hence increased capacity for diolefins.

It is an object of this invention to provide a novel process for separating diolefins from other hydrocarbons. It is another object of this invention to provide new and improved metal salt reagents for the separation and recovery of diolefins. It is a further object of this invention to provide for the complete and efficient recovery of diolefins from low-boiling hydrocarbon mixtures by certain improvements in the use of solid cuprous halide reagents as set forth below. More particularly, it is an object of this invention to provide an effective method and reagent for the recovery of butadiene and related hydrocarbons from mixtures containing the same.

We have discovered that superior reagents containing cuprous halides, such as the chloride, bromide, etc., and particularly those containing cuprous chloride, may be prepared by intimately mixing dry powder cuprous halide in the absence of any solution phase or impregnation or fusion operation, with fibrous non-adsorbent materials which produce permeable cohesive mechanical mixtures of high activity and capacity. These mechanical mixtures provide sufficient dispersion of the cuprous salt and of the solid cuprous halide-diolefin complex formed so that no packing or channeling occurs during the passage of hydrocarbon fluids, and substantially complete reaction of the cuprous salt is obtained.

In the preparation of our cuprous chloride reagents, the dry powdered cuprous salt is intimately mixed with various fibrous, non-adsorbent materials in such proportions that the solid particles of the cuprous chloride no longer sift free or settle on moderate agitation, but are uniformly distributed on the carrier in a relatively loose but cohesive mass. The carriers which are useful in preparing the reagents are those of medium length fiber, non-hygroscopic, and relatively free of the tendency to mat or "felt" together. For example, we have found that medium or short asbestos fiber, uncompressed cellulose fiber, such as is used in preparing insulating board, and some types of rock wool and glass fiber are satisfactory. The fibrous material utilized in the manner described should be in a sub-divided condition of the sort which will permit the existence of the fibers in an individual state or in small groups. This condition may be obtained in any well known manner as by shredding or grinding where the fibers are not readily obtained in other ways or do not normally exist in a proper state of sub-division.

The choice of carriers for our reagents is very important, and we have found particular advantages in the use of the fibrous non-adsorbent type disclosed. These carriers being non-hygroscopic do not accumulate moisture from the hydrocarbon streams and the reagents are thus rendered relatively nonsusceptible to deterioration by water. Further, the materials are relatively free of hydrocarbon-soluble material and are inert toward all materials present under the conditions of treatment. Also, the non-adsorbent quality of the carriers is of great benefit since unreacted hydrocarbons are not adsorbed to any great extent and the removal of non-diolefinic material prior to desorption of diolefins is greatly improved and the purity of the recovered diolefins is correspondingly increased.

The weight proportions of our reagent vary somewhat with the carrier used, but since the fibrous materials are of relatively low apparent density, the cuprous chloride content may range from any desired percentage below 50 per cent to as high as 70 to 85 per cent. Still higher concentrations may be mixed, but less uniform compositions are obtained. The maximum cuprous chloride content will vary somewhat with the dispersing power of the different carriers so that reagent compositions may be adjusted to suit individual applications. In applications utilizing a moving reagent as hereinafter described with reference to Figure 4, somewhat lower cuprous chloride contents may be desirable than when the reagent remains in situ. Thus, a satisfactorily cohesive reagent suitable for gradual movement countercurrent to the moving hydrocarbon stream may be prepared from asbestos and cuprous chloride with approximately 40–60 weight per cent of the latter ingredient.

The reagents we prepare thus contain very high percentages of active ingredient. At the same time, the physical and chemical properties are much superior to the powdered cuprous chloride alone. For example, our reagent, both before and after formation of the complex, is permeable to fluid flow without excessive pressure drop or channeling. These factors are of great importance since the formation of the diolefin complex causes a considerable increase in volume, which may cause difficulties in the use of certain other types of solid reagents or of cuprous chloride alone.

Our reagent permits satisfactory extraction of diolefins up to the point of substantially complete reaction of the cuprous salt without caking or lumping of the reagent. Thus, more complete utilization of the reagent and more efficient extraction of the diolefins are simultaneously obtained.

In one specific embodiment of our invention, a hydrocarbon liquid comprising $C_4$ hydrocarbons and containing butadiene is passed at suitable reduced temperatures in contact with a solid reagent prepared by mixing together dry powdered cuprous chloride and asbestos fiber. This reagent mixture is ordinarily placed in a vertical tower of relatively small cross-sectional area compared with its length and the hydrocarbon fluid flows through the reagent at flow rates permitting adequate reaction time for the formation of the solid, substantially insoluble butadiene-cuprous chloride addition product. This addition product is retained within the reagent bed, and the hydrocarbon mixture is vaporized at some point prior to its exit from the reagent tower and/or the treating system to remove any dissolved cuprous chloride or cuprous chloride-olefin compounds.

The drawings show various methods of using our improved reagents: Figure 1 represents an arrangement of equipment for treating liquid feeds; Figure 2 demonstrates the use of one chamber for separating diolefins from a mixture and another chamber for vaporizing the mixture prior to removing it from the system; Figure 3 is similar to Figure 1 except that a vapor feed is treated, and Figure 4 shows the use of counter-current treating methods.

Figure 1 shows a liquid feed containing $C_4$ hydrocarbons including butadiene entering through line 1 and passing through pressure reducing valve 2 into reagent tower 3 containing the cuprous chloride reagent. The lower part of the reagent tower is enclosed in a jacket 4 through which a heating or a cooling medium can be circulated. When butadiene is being absorbed, the reagent bed is held at suitable sub-atmospheric temperatures below about 60° F. which favor the formation of the cuprous chloride addition product. The pressure on the liquid feed is reduced by valve 2 at the entrance of the reagent bed to a value which permits vaporization of the hydrocarbons at atmospheric temperature, or even partial vaporization at the temperature of the extraction reaction. During passage through the cooled portion of the reagent bed, the hydrocarbon feed may be in either liquid or vapor state depending on the back-pressure on the outlet. If no back-pressure is being applied, the treating pressure is equivalent to the pressure drop through the reagent bed. In most cases, the $C_4$ hydrocarbons remain largely in the liquid state until reaching the unjacketed portion 3A of the reagent tower where vaporization occurs to result in a wholly vaporous effluent, which exits through line 5.

The vaporizing or unjacketed section 3A of the reagent tower may be empty or may contain either asbestos fiber or the cuprous chloride reagent present in the lower section of the tower. We usually prefer to have the unenclosed portion of the tower at least partly filled with cuprous chloride reagent in order that the diolefin extraction may continue in the vapor phase or even in the mixed phases which may be present in a portion of the upper section of the tower. The reagent present in the upper section of the tower may be active in the extraction reaction even without external cooling since the vaporization of the liquid hydrocarbon mixture produces temperatures corresponding to the end-point of the feed liquid. With $C_4$ liquid mixtures, these temperatures may range from 30 to 40° F. at atmospheric pressure when adequate insulation is provided.

When the reagent in tower 3 becomes spent, the liquid feed through line 1 is discontinued, the cooling medium is withdrawn from the outer jacket 4, and the unreacted liquid hydrocarbons remaining in the tower are removed by vaporization at temperatures below those causing decomposition of the butadiene addition product, generally from about 80 to 120° F. After the reagent space is substantially free of unreacted hydrocarbons, the temperature is raised to a level sufficient to cause decomposition of the diolefin addition compound, and the dolefin evolved is withdrawn and recovered in substantially pure form. The heating may be done by circulation of a heating medium in the outer jacket 4, and the section 3A of tower 3 outside of jacket 4 may be heated, if desired, by the hot gases passing through or by independent means not shown.

Figure 2 shows an alternative arrangement in which the reagent tower is divided into two separate sections with independent temperature regulation for each section. In this instance, the hydrocarbon mixture being treated is fed in liquid phase through line 6, and will ordinarily remain in liquid phase throughout the first reagent tower 7. Temperatures in tower 7 are controlled by circulation of suitable media through jacket 8 which surrounds it, and temperatures in the second tower 11 are similarly controlled by circulation through jacket 12. After passage through line 9 and pressure reducing valve 10, the hydrocarbons may be in either liquid or gas phase or both in tower 11. The hydrocarbons are completely vaporized prior to passage from the apparatus through line 13, and the temperature may be adjusted to assure vaporization at the pressures prevailing in tower 11 and line 13. When treating $C_4$ hydrocarbon mixtures with end-points not exceeding 40 to 50° F., corresponding temperatures may serve to vaporize the mixture while permitting the extraction of any diolefins which may remain in the mixture at this point. When treating mixtures of higher boiling points, higher temperatures will be necessary in tower 11, and the extraction reaction will be more or less limited to tower 7. Also, vaporization temperatures in tower 11 may be lowered by employing sub-atmospheric pressures in the system from valve 10 to the effluent line 13.

While it is indicated that both towers 7 and 11 are filled with our cuprous halide reagent, tower 11 may be wholly or partly empty or may contain only our fibrous carrier material. We prefer, however, to provide two towers with more or less similar contents of the cuprous salt reagent so that the service of the towers can be reversed at any time if desirable.

When most of the reagent has been used up in forming the complex, the hydrocarbon feed is shut off, and unreacted hydrocarbons are removed from the towers and butadiene then desorbed as described above with reference to Figure 1.

Figure 3 illustrates still another method of operation in which the feed to be treated may be in the vapor phase. In this embodiment, the vapor entering through line 14 to tower 15 is wholly or partially liquefied by the low temperatures maintained in the lower portion of tower 15 by a refrigerant in jacket 16 and, if desired, by a moderate back-pressure maintained on tower 15 by the reagent itself and/or by the valve 18. The liquefied hydrocarbons after passage through the jacketed section of the bed re-vaporize in the upper section 15A outside the cooling jacket, although the vapor temperature therein may be only slightly higher than the liquid temperature in the case of $C_4$ hydrocarbon mixtures. The butadiene-free vapors then pass out through line 17 and valve 18. Butadiene is liberated from the reagent as hereinbefore described by circulating a heating medium through the outer jacket 16.

Figure 4 illustrates an adaptation of the process in which the reagent and the liquid hydrocarbons may move counter-current to each other, with spent reagent being removed from one end of the reagent tower while the treated liquid exits from the opposite end. The reagent tower 20 is surrounded by a jacket 21 through which a refrigerant is circulated. The liquid feed enters by line 19 and passes through the cooling jacket 21 into the bottom of reagent tower 20, where it contacts the downwardly moving reagent. The treated liquid passes through line 23 to vaporizer 24, and the vapors exit through line 25. Any cuprous chloride deposited in vaporizer 24 may be removed through line 26 and valve 27 and used for making additional reagent. The fresh reagent enters reagent tower 20 through line 22, and after contact with the hydrocarbons for such a period that the cuprous chloride content is substantially completely converted to the diolefin addition product, passes out of the tower through line 28 to chamber 29 bearing said diolefin addition compound. The passage of reagent through the tower may be accomplished by screw-conveyors or similar devices or by piston plungers or other positive displacement methods which give satisfactory movement of the mobile reagent mass. In chamber 29, any occluded unreacted hydrocarbons are vaporized and the vapors pass through lines 30 and 31 to vessel 24. These extraneous hydrocarbons are removed intermittently, and then sufficient heat is applied by steam coils or other suitable means 32 to decompose the diolefin addition compound, and the evolved diolefin is taken from desorption chamber 29 through lines 30 and 33 to storage. The regenerated reagent may then be taken through line 34 and valve 35 and returned to line 22 for further use. Of course, the functions of chamber 29 may, by suitable modifications, be carried out in a continuous manner.

While the foregoing illustrative diagrams show certain specific arrangements of equipment for carrying out our invention, many modifications are possible and operable within the teachings of our disclosure. Further, while the diagrams indicate a semi-continuous type of operation, it will be obvious that by providing multiples of the necessary equipment the process may be made continuous. Also, while the reagent towers are shown as single vessels enclosed in heating or cooling jackets, other arrangements are satisfactory, such as a number of parallel tubes with headers or manifolds at the ends or U-shaped tubes disposed within the heat exchange medium. Or the reagent beds may contain internal coils or the like through which the heat exchange medium is circulated.

The temperatures which are maintained in the extraction of butadiene by reaction with our cuprous chloride reagents are between —40 and +80° F., with a somewhat narrower range of 10 to 60° F. ordinarily used for economic reasons. At these temperatures, $C_4$ hydrocarbon mixtures comprising butadiene, butenes and butane are near the dew-point and relatively small pressure changes may cause condensation or vaporization. Thus, the $C_4$ mixtures usually treated are at least partially liquefied at low superatmospheric pressures of 0.5 to 50 pounds gage. In order to maintain a predominantly liquid material in the major portion of the reagent bed, these small back-pressures may be maintained by valves, or by selecting reagent beds of such depth that the resistance to flow will cause liquefaction. Conversely, the vaporization may occur when the pressure is released at or near the exit of the reagent bed, or in the apparatus provided separately for vaporization.

The heat of vaporization may be utilized in cooling the reagent bed, cooling the feed ahead of the reagent bed, or in other ways apparent from the apparatus designs and flow diagrams illustrated. Vaporization within the reagent bed is of particular value since direct heat exchange is obtained to compensate for the heat of formation of the diolefin-cuprous chloride addition complex. This heat of formation is relatively large and may result in measurable temperature rise when liquids of relatively high diolefin content are being treated. The value of direct heat exchange is amplified by the somewhat poor rate of heat transfer through the particular types of solid reagent beds when indirect exchange is employed.

We prefer to maintain liquid phase treating conditions within at least a part of the reagent bed for the reason that longer contact time of hydrocarbons with the cuprous chloride is obtained than in gas phase treating at comparable through-puts. Thus in treating one liquid volume of hydrocarbons per hour per volume of reagent, the effective contact time is one hour, whereas in gas phase treating the corresponding effective contact time is only about 18 seconds. We have noted that in many instances the longer contact time is desirable from the standpoint of more complete diolefin separation. However, the liquid hydrocarbon mixtures containing olefins, for example butenes and pentenes, dissolve considerable quantities of cuprous chloride which must be removed and recovered prior to further processing. By our method of vaporizing the hydrocarbons before they leave the treating system, we are able to retain the cuprous salt in place on the reagent and ordinarily eliminate any type of after treatment to recover the reagent or to purify the hydrocarbons.

The apparatus diagrammed in Figures 2 and 4 is of particular advantage in the treatment of mixtures containing C4 and C5 hydrocarbons for the recovery of butadiene, isoprene, and/or piperylene. In these instances, vaporization of the liquid feed to remove dissolved cuprous salts subsequent to the formation of the diolefin addition compounds may require a separate vaporization zone. In the separate zone with independent temperature control the temperatures may be adjusted as required, and the vaporizer may often be empty or filled only with the loosely packed fibrous carrier.

As explained above, pressures in our process are effectively those which favor vaporization of the hydrocarbons subsequent to all or part of the diolefin extraction step. Thus, we may operate with just sufficient pressure to maintain liquid phase up to the point where vaporization is desired, and atmospheric, sub-atmospheric or low super-atmospheric pressures may be utilized as required.

In the desorption or butadiene recovery step, temperatures of from 140 to 210° F. or higher may be employed. The decomposition of the butadiene addition complex occurs within this range with the actual rate of butadiene evolution varying with the pressure. We ordinarily prefer temperatures of 180 to 210° F. at atmospheric pressure to obtain rapid desorption. Optimum temperatures for desorbing other diolefins are chosen according to the decomposition characteristics of the given complex.

While any flow rates may be used which produce the desired degree of diolefin separation, we have noted that satisfactory results are obtained when treating at rates not usually exceeding 2 to 5 liquid volumes per hour per volume of reagent. The permissible treating rates will vary with the diolefin content of the mixture being treated so that specific conditions will usually be determined for the individual applications of our process.

The following exemplary operations will serve further to illustrate possible uses of our process. However, since the examples could be multiplied greatly, no limitation thereto is implied.

Example I

A liquid hydrocarbon mixture produced by the dehydrogenation of normal butenes had the following approximate composition prior to treatment by our process:

| | Mol per cent |
|---|---|
| Propane | 1.2 |
| Butane | 8 |
| Butenes | 75 |
| Butadiene | 15.8 |

This mixture was cooled by heat exchange with the vaporous material at the exit of the treating apparatus and passed upwardly through a bed of reagent prepared by intimately mixing short-fiber asbestos with powdered cuprous chloride. The reagent mixture contained 70 weight per cent of cuprous chloride and weighed about 48 pounds per cubic foot. The concentration of active ingredient was thus about 33 pounds per cubic foot, with very satisfactory porosity and permeability.

The reagent bed was 10 feet in depth, while the overall length of the vertical reagent tower was 11 feet. Eight feet of the reagent bed was contained within a jacket through which propane refrigerant was circulated, while the upper two feet of the bed projected beyond the jacket. At a flow rate of 1.5 liquid volumes of feed per hour per volume of reagent, substantially complete absorption of butadiene was obtained up to the point of over 90 per cent of the theoretical capacity of the reagent based on an addition compound formula of $C_4H_6 \cdot (CuCl)_2$, at a temperature of 25° F.

In the unjacketed section of the reagent bed complete vaporization of the treated hydrocarbons occurred with the pressure on the outlet line only slightly above atmospheric. The vapors were compressed and returned to the dehydrogenation process.

When the reagent became saturated with respect to butadiene, the feed was discontinued and refrigerant was withdrawn from the cooling jacket. The reagent bed temperature was raised while unreacted hydrocarbons vaporized and were withdrawn from the tower. The temperature was then raised to about 200° F. by circulation of steam in the reagent tower jacket, and substantially pure butadiene was evolved and withdrawn from the bed.

Equivalent results were obtained when using a reagent prepared from cellulose fiber and cuprous chloride containing about 60 weight per cent of the latter component.

Example II

The apparatus of Figure 4 was employed for the separation of butadiene from a C4 hydrocarbon mixture containing about 12 volume per cent of butadiene. This liquid feed was passed at 45° F. and about 15 lb. gage pressure through the reagent space while the reagent consisting of 50 weight per cent of cuprous chloride and 50 weight per cent of asbestos fiber was passed countercurrent to the hydrocarbons at a rate of 1 volume of reagent per hour per volume of liquid hydrocarbons. The treated hydrocarbons were vaporized in a separate vessel while the substantially spent reagent was removed intermittently at 30 minute periods to the diolefin recovery vessel where the unreacted hydrocarbons were vaporized at a temperature of about 100° F. and the vapors were withdrawn and combined with the other effluent vapor stream. The temperature was subsequently raised to 190° F. and the butadiene was evolved and withdrawn. The reagent was then returned for further use.

The hydrocarbon fluids to be treated for the removal of diolefins may be more or less narrow boiling range fractions comprising low-boiling hydrocarbons of three to five or more carbon atoms and containing from about 1 to 50 or more weight per cent of diolefin. The optimum treating rates and the length of the absorption cycle for any particular reagent preparation will vary as indicated with the diolefin content of the hydrocarbon mixture being treated. Hydrocarbons containing triple-bond linkages may be removed from the mixtures if desired, prior to treatment by the described process.

In the foregoing disclosure the treatment of butadiene-containing hydrocarbon liquids or gases is exemplary of the application of the method, which may also be utilized for the concentration of other low-boiling aliphatic diolefins such as those of five carbon atoms, especially isoprene and piperylene. The modifications required involve adjustment of the temperature ranges of absorption and desorption as well as the treating rates, all within the scope of the present disclosure, and obvious to one skilled in the art taken in the light of the teachings contained herein.

We claim:

1. A process for the separation of low-boiling diolefins from hydrocarbon mixtures containing the same and close-boiling non-diolefinic hydrocarbons which comprises passing said mixture at an absorption temperature through a bed of solid cuprous halide reagent which is a permeable cohesive mechanical mixture consisting of a dry powdered cuprous halide uniformly distributed in particulate form on an inert non-adsorbent non-hygroscopic fibrous carrier which is free of tendency to mat, said cuprous halide being in such proportions and dispersed on said fibrous carrier sufficiently that stratification, packing and channeling of said mixture are prevented and the solid particles of said cuprous halide are retained in position upon said fibrous carrier upon handling and agitation and during passage of said mixture.

2. The process of claim 1 wherein said fibrous material is asbestos fibers.

3. The process of claim 1 wherein said fibrous material is cellulose fibers.

4. The process of claim 1 wherein said diolefin is butadiene.

WALTER A. SCHULZE.
GRAHAM H. SHORT.